(12) United States Patent
Cherry et al.

(10) Patent No.: US 7,300,385 B2
(45) Date of Patent: Nov. 27, 2007

(54) CONTROL STRATEGY FOR A DUAL CRANKSHAFT ENGINE COUPLING ARRANGEMENT

(75) Inventors: Jeffrey P Cherry, Livonia, MI (US); George Konstantakopoulos, Birmingham, MI (US); Steven A Barnhart, Rochester Hills, MI (US); Donald L Carriere, Livonia, MI (US)

(73) Assignee: Chrysler LLC, Auburn Hills, MI (US)

( * ) Notice: Subject to any disclaimer, the term of this patent is extended or adjusted under 35 U.S.C. 154(b) by 550 days.

(21) Appl. No.: 10/952,291

(22) Filed: Sep. 28, 2004

(65) Prior Publication Data

US 2006/0065503 A1    Mar. 30, 2006

(51) Int. Cl.
   *F16H 37/06*     (2006.01)
   *B60W 10/02*    (2006.01)
   *B60W 10/04*    (2006.01)

(52) U.S. Cl. .......................... 477/181; 74/661
(58) Field of Classification Search .............. 477/2, 477/6, 118, 181; 74/661
   See application file for complete search history.

(56) References Cited

U.S. PATENT DOCUMENTS

| | | | | |
|---|---|---|---|---|
| 2,505,856 A | * | 5/1950 | Gregory | 74/664 |
| 2,527,424 A | * | 10/1950 | Johan | |
| 2,860,713 A | * | 11/1958 | Peterson | 416/169 R |
| 2,878,691 A | * | 3/1959 | Schjolin | 477/6 |
| 5,398,508 A | * | 3/1995 | Brown | 60/718 |
| 6,814,686 B2 | * | 11/2004 | Carriere et al. | 477/6 |
| 6,935,115 B2 | * | 8/2005 | Anderson | 60/698 |

* cited by examiner

*Primary Examiner*—Tisha Lewis
(74) *Attorney, Agent, or Firm*—Thomas Jurecko

(57) ABSTRACT

A control method for coupling a first engine to a second engine in a vehicle includes determining a current position of a throttle body that regulates power output from the first and second engines. Determining a set speed for the first and second engines that corresponds to a desired power output from the first and second engines. Determining a compensation position for the throttle body and moving the throttle body to the compensation position. Actuating a clutch to a closed position such that the first engine is coupled to the second engine. Determining whether the first engine and the second engine are in phase. Actuating the clutch to slip if the first engine is not in phase with the second engine and actuating the clutch to the closed position when the first engine and the second engine are in phase.

6 Claims, 10 Drawing Sheets

CONTROL STRATEGY FOR A DUAL CRANKSHAFT ENGINE COUPLING ARRANGEMENT

FIELD OF THE INVENTION

The present invention relates to a power unit for a vehicle and more particularly, a control strategy for a dual crankshaft engine coupling arrangement.

BACKGROUND OF THE INVENTION

Internal combustion engines have been used for many years for providing motive power for driving a vehicle. Most vehicles on the road today are provided with either a four, six, or eight cylinder engine which is selected based upon the typical torque demand requirements for the individual type vehicle being designed. For example, four cylinder engines are typically used for commuter vehicles which are compact and typically have low load requirements and limited performance expectations. Six cylinder and eight cylinder engines are typically employed in larger vehicles wherein larger load carrying capacity and higher performance are expected. Some of the existing vehicle designs have suffered from low fuel efficiency due to the fact that the internal combustion engine for the vehicle has to be designed with a sufficient capacity to meet the high torque demands that are only occasionally required.

The dual crankshaft engine of the present invention overcomes these deficiencies by providing a powertrain system that includes a dual crankshaft engine with one of the engine portions being independently operable for providing driving torque to a transmission while the second engine portion can be utilized to supplement the driving torque of the first engine portion to meet higher torque demand requirements. Operation of the dual crankshaft engine is provided such that during normal driving at constant speeds and typical driving loads, the first engine portion is utilized for providing driving torque to the wheels of the vehicle. During periods of operation where increased levels of torque are required, such as during acceleration, pulling a heavy load, or climbing a hill, the second engine portion is operated in conjunction with the first engine portion for meeting the higher torque demand requirements. A coupling arrangement is provided for connecting the first and second crankshafts for starting the second engine portion and also for engaging the first and second crankshafts together in phase with one another. In order to effectively control this dual crankshaft engine, a control strategy is provided that efficiently and effectively determines when and how to couple the second engine to the first engine.

SUMMARY OF THE INVENTION

A control method for coupling a first engine to a second engine of a dual crankshaft engine is provided. The method includes determining a current position of a throttle body that regulates power output from the first and second engines. Determining a set speed for the first and second engines that corresponds to a desired power output from the first and second engines. Determining a compensation position for the throttle body and moving the throttle body to the compensation position. Actuating a clutch to a closed position such that the first engine is coupled to the second engine. Determining whether the first engine and the second engine are in phase. Actuating the clutch to slip if the first engine is not in phase with the second engine and actuating the clutch to the closed position when the first engine and the second engine are in phase.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The present invention pertains to a method for controlling a dual engine having a crankshaft coupling device. Although the present invention is applicable to virtually any dual crankshaft engine arrangement, the method of the preferred embodiment is illustrated with a dual engine each having four cylinders and a crankshaft coupler with various embodiments. It should be further appreciated that the dual crankshaft engine may include separate engine blocks for each crankshaft or one engine block having two crankshafts without departing from the scope of the present invention. The dual crankshaft engine coupler arrangement will be addressed first, with particular reference to FIGS. 1-9, and the method of controlling the dual crankshaft engine coupler arrangement will be addressed thereafter, with particular reference to FIG. 10.

Figure 1:
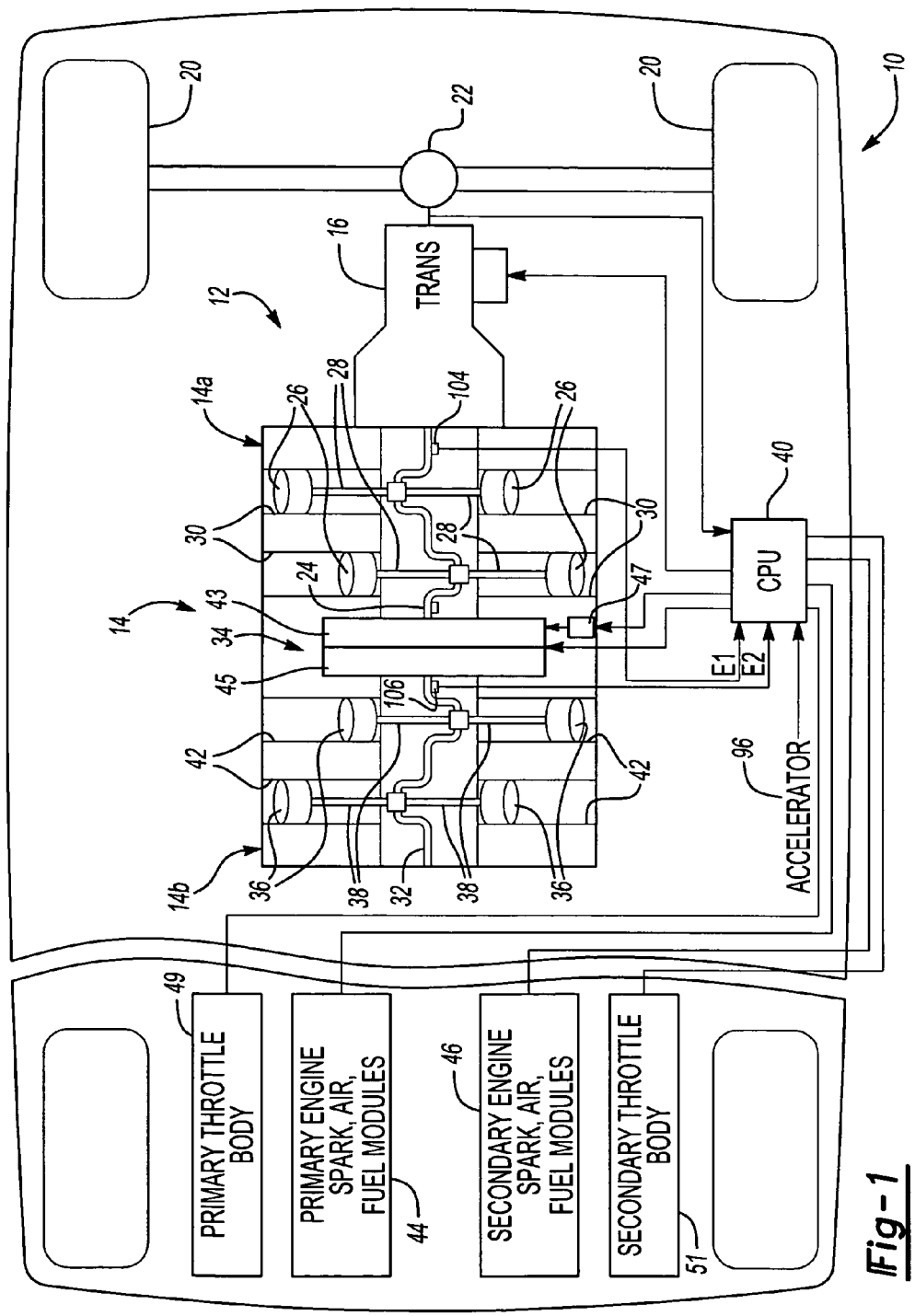
FIG. 1 is a schematic view of a vehicle powertrain system incorporating a dual crankshaft engine coupling arrangement according to the principles of the present invention.

Accordingly, turning now to FIG. 1, a vehicle 10 is shown provided with a powertrain system 12 including a dual crankshaft engine 14 (which will be described in greater detail herein) connected to a transmission 16 in a vehicle that may or may not use hybrid technology. A pair of drive wheels 20 are drivingly connected to the transmission 16 via a differential 22.

The dual crankshaft engine 14 includes a primary (first) engine portion 14a including a primary or first crankshaft portion 24 (or first output shaft) having a plurality of pistons 26 connected thereto by corresponding connecting rods 28. Each of the pistons 26 are disposed in a corresponding cylinder 30 as is well known in the engine art. For purposes of illustration, four pistons 26 are mounted to the first crankshaft portion 24, although it should be understood that more or fewer pistons can be connected to the first crankshaft portion 24 without departing from the spirit and scope of the present invention.

A secondary (second) engine portion 14b including a second crankshaft portion 32 (or second output shaft) is selectively coupled to the first crankshaft portion 24 by a coupling device 34. A plurality of pistons 36 are connected to the second crankshaft portion 32 by corresponding connecting rods 38. Each of the pistons 36 are disposed in a corresponding cylinder 42 as is well known in the engine art.

The coupling device 34, described in various embodiments in FIGS. 2-9, selectively engages the second engine portion 14b to the first engine portion 14a. Generically speaking, the first crankshaft portion 24 is coupled at an end thereof to a first clutch element 43 within the coupling device 34. The second crankshaft portion 32 is coupled at an end thereof to a second clutch element 45 also disposed within the coupling device 34. The second engine portion 14b is engaged with the first engine portion 14a by engaging the second clutch element 45 to the first clutch element 43, as will be described in greater detail below. A servo motor brake 47 is coupled to the coupling device 34 and selectively prevents movement of the clutch elements 43, 45.

A central processor unit 40 is provided for controlling the transmission 16, the primary and secondary engine fuel and spark modules 44, 46, primary and secondary throttle bodies 49, 51 for providing air to the engines 14a, 14b, as well as controlling the coupling device 34 and servo motor brake 47. Alternatively, a single throttle body may be employed rather than a primary and secondary throttle body.

Figure 2:
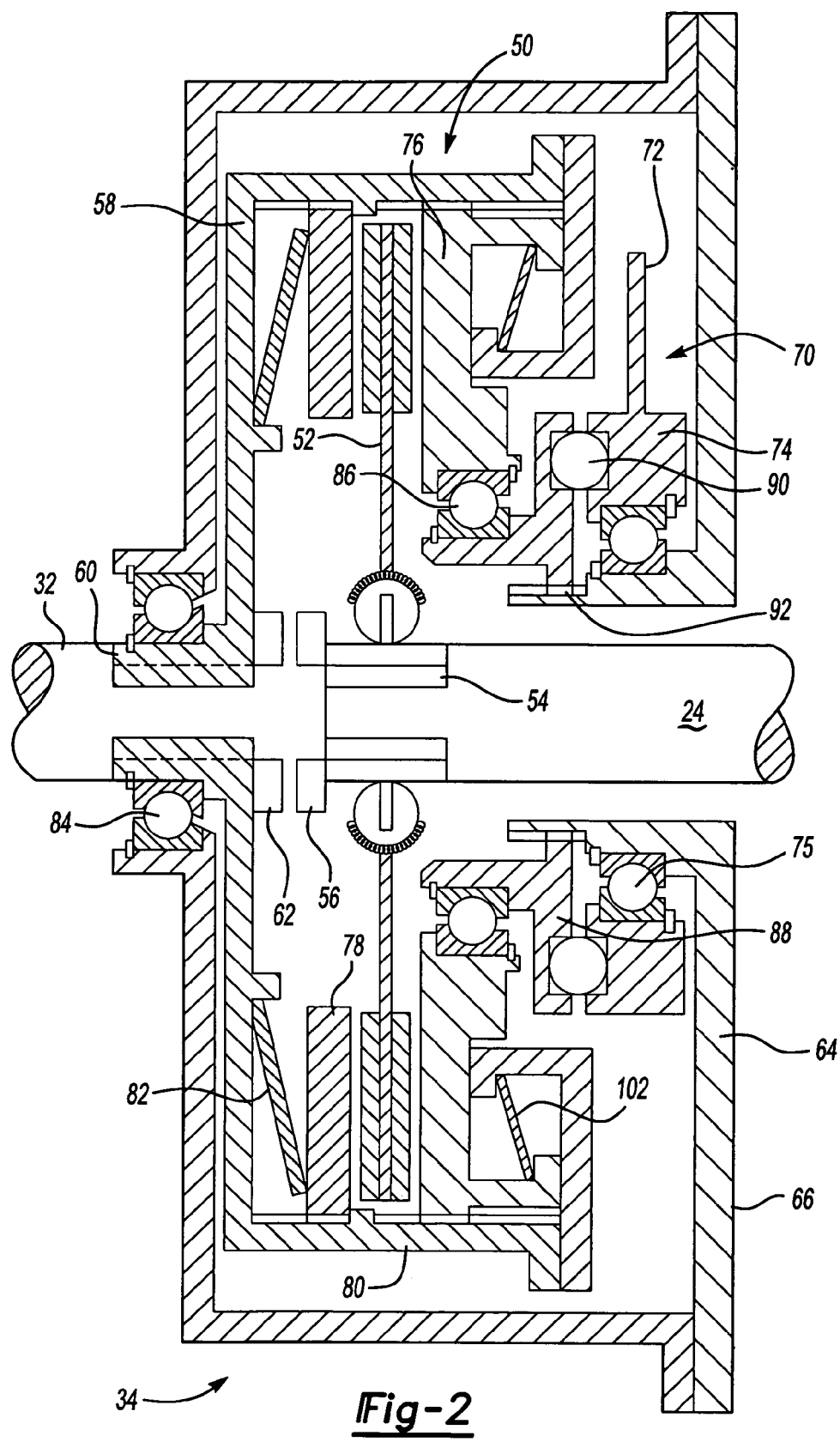
FIG. 2 is a cross-sectional view of a coupling device for coupling a first and second crankshaft of a dual crankshaft engine according to the principles of the present invention.

A first embodiment of the coupling device, according to the principles of the present invention, is shown in FIG. 2. The coupling device 34 couples the two engine crankshafts 24, 32 in series such that a primary engine, connected directly to a transmission can be used to propel a vehicle for a majority of its operating time, and a second engine crankshaft can be coupled to the first engine when additional power is needed for rapid accelerations or high load operating conditions.

As shown in FIG. 2, the primary engine crankshaft 24 is connected to a starter clutch assembly 50 that is engageable to provide driving torque from the primary engine crankshaft 24 to the secondary engine crankshaft 32. The starter clutch assembly 50 includes a clutch disc 52 connected to the primary engine crankshaft 24 by an angular specific spline 54 on the crankshaft 24. The clutch disc 52 is also connected to an angular specific dog clutch 56 which may slide along the splined portion 54 of the primary crankshaft 24. The secondary engine crankshaft 32 is connected to a clutch plate carrier 58 by an angular-specific spline 60. An angular specific dog clutch 62 is connected to the clutch plate carrier 58 for mating engagement with the dog clutch 56 of the primary crankshaft 24. The dog clutch portions 56, 62 of the primary and secondary crankshafts 24, 32, respectively, serve as a phase clutch mechanism for matingly engaging the primary and second crankshaft 24, 32 at a predetermined phase angle relative to one another. Specifically, the angular specific dog clutch sides 56, 62 and the angular specific splines 54, 60 attaching the dog clutch 56 to the primary crankshaft 24 and the dog clutch 62 to the secondary crankshaft 32 are designed such that when the dog clutch portions 56, 62 are engaged, the secondary engine crankshaft 32 will rotate at the same speed in a design specific secondary crankshaft phase angle relative to the primary engine crankshaft 24.

The coupling device 34 includes a housing 64 which includes a surface 66 which is attached rigidly to the cylinder block of the primary engine 14a by bolts or other fastening means (not shown). The starter clutch assembly 50 includes an actuator system 70 which, according to a first embodiment of the present invention, includes a clutch engagement lever 72 to cause a clutch engagement cam and ball ramp mechanism 74 to move a pressure plate 76 into frictional engagement with the clutch disc 52 and subsequently the clutch plate 78 to cause the clutch plate 78, the pressure plate 76 and the secondary engine crankshaft 32 to begin to rotate in the same direction as the clutch disc 52 that is driven by the primary engine crankshaft 24. Torque from the clutch disc 52 is imparted by the pressure plate 76 into the clutch plate carrier 58 by means of internal splines 80 which are engaged with corresponding external splines on the clutch plate 78 and pressure plate 76.

The rotation of the clutch plate carrier 58 and pressure plate 76 are guided in their rotation within the coupling housing 64 by pilot bearing 84 and clutch throw-out bearing 86, respectively. A receiving ring 88 of the clutch engagement cam and ball ramp assembly 74 is actuated by balls 90. The receiving ring 88 then acts upon the pressure plate 76 through clutch throw-out bearing 86. The receiving ring 88 is rotationally restrained by splines 92 on the coupler housing 64 in order to provide a reaction torque for the engagement cam and ball ramp assembly 74.

The angular specific dog clutch 56, 62 includes precision face splines, consisting of several teeth arranged radially on the face surfaces of the parts 56, 62 and have one tooth space missing on one of the parts 56, 62 and one extra tooth filling a space on the other part 56, 62 such that the clutch will only engage in one angular specific orientation desired for proper timing relationship coupling of the engine crankshafts 24, 32. Additionally, the face surfaces of the teeth are generated helices to assist in smooth engagement and disengagement as parts 56 and 62 are moved together and apart axially.

The non-running secondary engine 14b can be started, brought up to the speed of the running primary engine 14a, and the two engines 14a, 14b can be locked together at a desirable specific phase angle relationship as follows. When it is determined by the central processor unit 40 based on the driver's throttle pedal 96 position and movement that the non-running secondary engine 14b is needed to provide additional power to assist the primary engine 14a, clutch engagement lever 72 is rotated by an actuator mechanism (described in greater detail herein) to engage the starter clutch assembly 50 and start the secondary engine crankshaft 32 rotating. At a specific desirable speed threshold of the secondary engine crankshaft 32, the secondary engine 14b is provided fuel, air, and ignition control via the central processor unit 40 controlling the fuel, air, and ignition module 46 so that the second engine 14b starts and begins to run. The clutch engagement lever 72 is then returned to its clutch disengaged position, allowing the secondary engine 14b to accelerate and rotate under its own power.

Since the two engine speeds are not matched, the dog clutch 56, 62 does not engage. When the clutch engagement lever 72 is returned to its clutch-disengaged position, cone spring 102 forces the pressure plate 76 into a disengaged position with respect to the clutch disc 52 and clutch plate 78, allowing acceleration of the now running and accelerating secondary engine 14b. When the rotating speed of the secondary engine crankshaft 32 is nearly the same as the primary engine crankshaft 24, the clutch engagement lever 72 is again rotated to engage the pressure plate 76, the clutch disc 52 and the clutch plate 78. This engagement reduces the speed differential between the two crankshafts 24, 32 to a point where the dog clutch 56, 62 can engage and lock the secondary engine crankshaft 32 to the primary engine crankshaft 24. The phase-specific dog clutch 56, 62 engages at a design-specific phase angle such that the secondary engine 14b and the primary engine 14a are running at the same speed. Power is then delivered from the secondary engine crankshaft 32 to the primary engine crankshaft 24, and the engines 14a, 14b are firing alternately and evenly.

When the equal crankshaft speed and even engine firing are detected by sensors 104, 106 the clutch engagement lever 72 is rotated farther to its over center and toggle-locked position. To turn off the secondary engine 14b, it is only necessary to disengage the pressure plate 76 by rotating the clutch engagement lever 72 to its clutch-disengaged position and turn off the ignition and fuel to the secondary engine 14b.

Alternative means of forcing the pressure plate 76 into engagement with the clutch disc 52 will be described herein. Furthermore, the method shown using clutch engagement lever 72 and engagement cam and ball ramp 74 can also be replaced with alternative mechanisms as will also be described herein. Furthermore, it should be noted that the angular specific dog clutch 56, 62 can be designed to lock the engine crankshafts 24, 32 at any of several desirable crankshaft angles depending on the number of cylinders of each engine portion 14a, 14b and the number of engines to be coupled.

Figure 3:
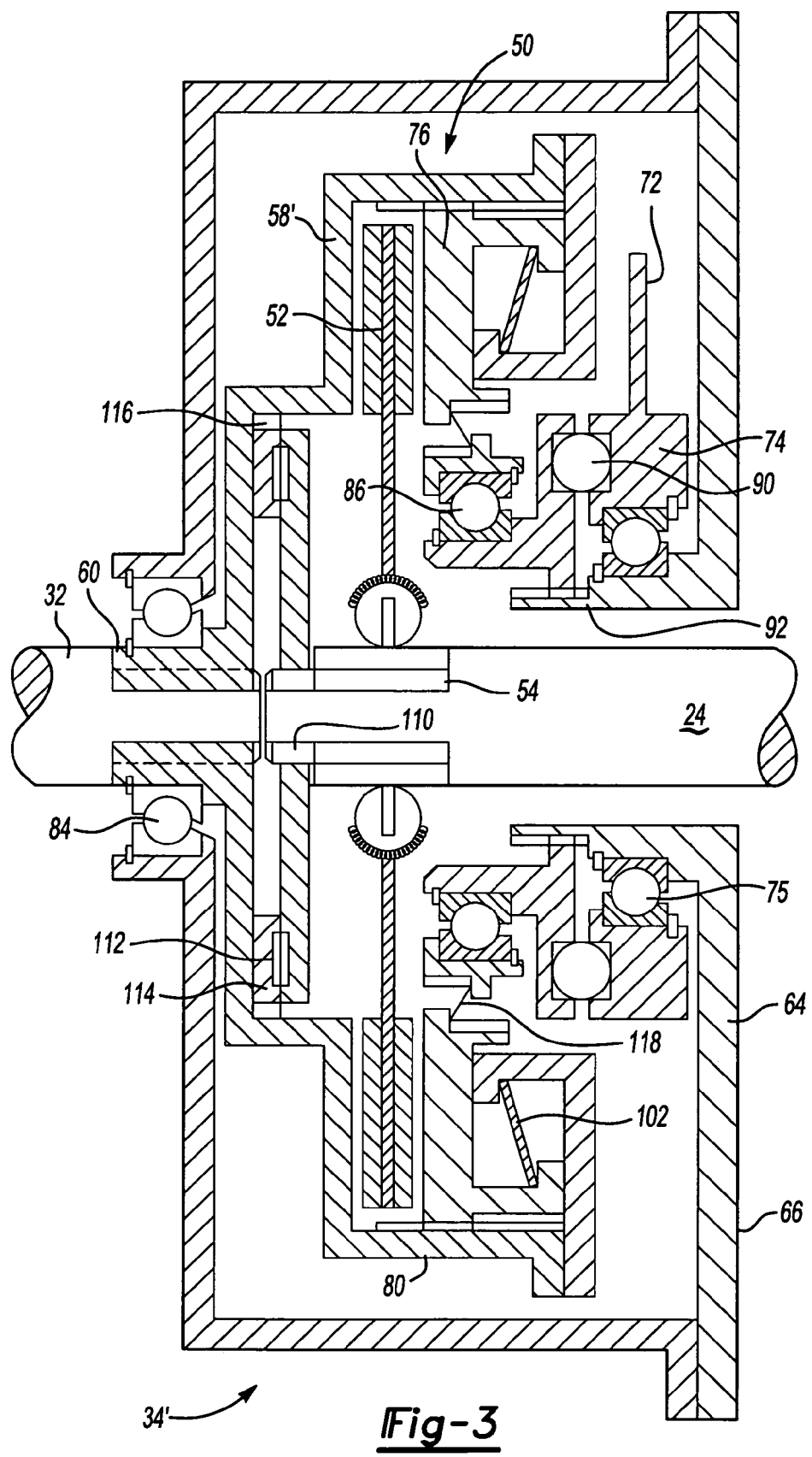
FIG. 3 is a cross-sectional view of a coupling device for a dual crankshaft engine according to a second embodiment of the present invention.

With reference to FIG. 3 wherein common reference numerals are utilized to represent the same or similar elements, a second embodiment of a coupling device 34' which utilizes an overrunning clutch instead of a dog clutch will now be described. Since the structure and operation of the starter clutch 50 is the same as that described with reference to FIG. 2, the structure and operation thereof will now be described with regard to the embodiment shown in FIG. 3. The coupling device 34' is provided with a primary crankshaft 24 that includes an angular specific spline 110 which supports an angular specific overrunning clutch portion 112. The secondary engine crankshaft 32 is connected to a clutch plate/carrier 58' by an angular specific spline 60. An opposite side of the angular specific overrunning clutch 114 is connected to the clutch plate/carrier 58' by an angular specific spline 116. The angular specific overrunning clutch 112, 114 and its angular-specific spline connection 110, 116 to the primary engine crankshaft 24 and the clutch plate/carrier 58', respectively, in combination with the angular-specific spline connection 60 of the clutch plate/carrier 58' to the secondary engine crankshaft 32 are designed such that the secondary engine crankshaft 32 cannot rotate faster than the primary engine crankshaft 24. Furthermore, the overrunning clutch 112, 114 will restrain the secondary engine crankshaft 32 to rotate at the same speed and at a design specific secondary crankshaft phase angle relative to the primary engine crankshaft 24.

The primary engine crankshaft 24 is free to operate without restraint since when the secondary engine crankshaft 32 is either stationary or rotating slower than the primary engine crankshaft 24, the overrunning clutch 112, 114 overruns and cannot transmit torque. If, while the primary engine 14a is propelling the vehicle, and the secondary engine 14b is not running, a powertrain computer 40 determines from the driver's accelerator pedal position and movement that additional power is needed from the secondary engine 14b, then an actuator (described in detail herein) originally attached to the coupling housing 64 rotates the clutch engagement lever 72 to cause the clutch engagement cam and ball ramp 74 to move the pressure plate 76 into frictional engagement with the clutch disc 52. Subsequently, the clutch plate/carrier 58', the pressure plate 76 and the secondary engine crankshaft 32 begin to rotate in the same direction as the clutch disc 52 that is driven by the primary engine crankshaft 24. Torque from the clutch disc 52 is imparted to the pressure plate 76 and clutch plate/carrier 58' by means of splines 80 in the same manner as described with reference to FIG. 2.

When the secondary engine portion 14b fires, and the secondary crankshaft 32 achieves a rotating speed, which is the same as the primary engine crankshaft 24, the clutch disc 52 is released to cause the phases of the two engines 14a, 14b to slip. Once the speed of the secondary engine 14b attempts to exceed that of the speed of the primary engine 14a, the angular-specific overrunning clutch 112, 114 locks the secondary engine crankshaft 32 to the primary engine crankshaft 24 at a design-specific phase angle such that the secondary engine 14b and the primary engine 14a are running at the same speed. Power is then delivered from the secondary engine crankshaft 32 to the primary engine crankshaft 24, and the engines 14a, 14b are firing alternately and evenly as determined by the angular-specific overrunning clutch 112, 114 locking angles. When the equal crankshaft speeds and even engine firing is detected by crankshaft sensors 104, 106 (FIG. 1), the clutch engagement lever 72 is again rotated to its clutch engaged position, further locking the two crankshafts 24, 32 together to prevent the secondary engine crankshaft 32 from rotating slower than the primary engine crankshaft 24 and overrunning the angular-specific overrunning clutch 112, 114. Cone spring 118 serves to provide a small amount of over travel of the clutch engagement cam and ball ramp 74 with respect to the pressure plate 76 so that the engagement cam and ball ramp 74 can be moved beyond the position of clutch engagement to an over center position or toggle lock position so that the clutch will remain engaged without constant force being exerted on the clutch engagement lever 72. To turn off the secondary engine 14b, it is only necessary to disengage the pressure plate 76 by rotating the clutch engagement lever 72 to its clutch-disengaged position and turn off the ignition and fuel to the secondary engine.

Figure 4:
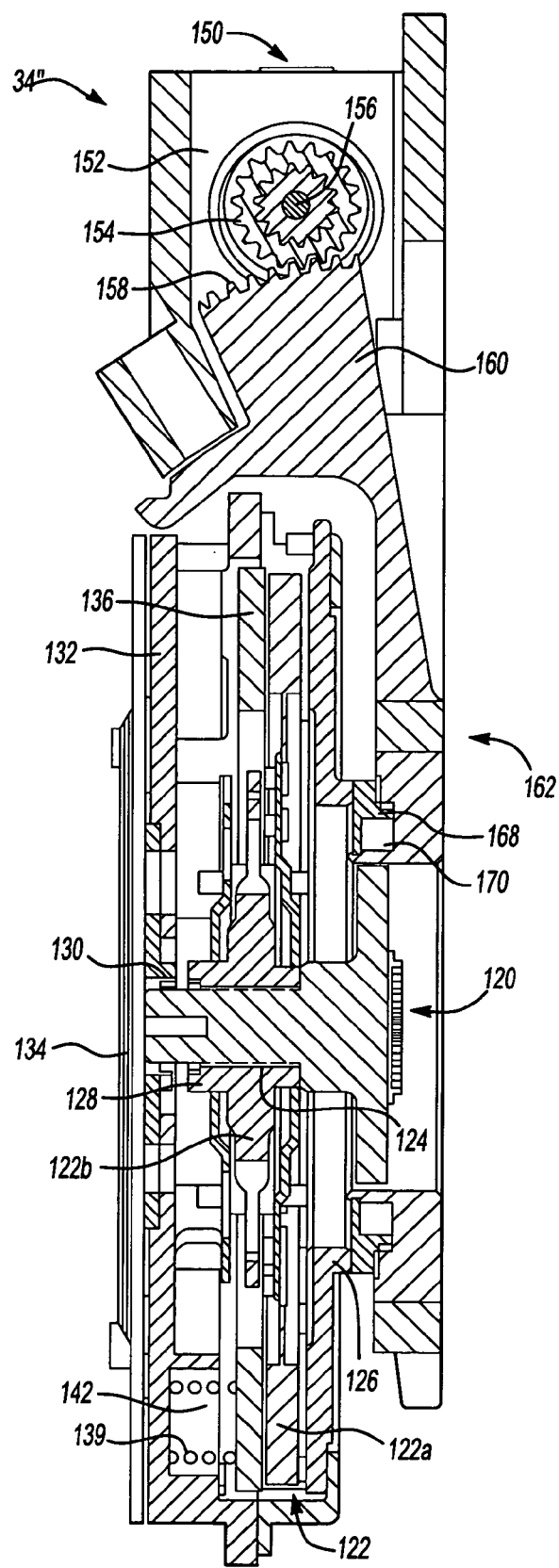
FIG. 4 is a cross-sectional view of a coupling device for a dual crankshaft engine according to a third embodiment of the present invention.
Figure 5:
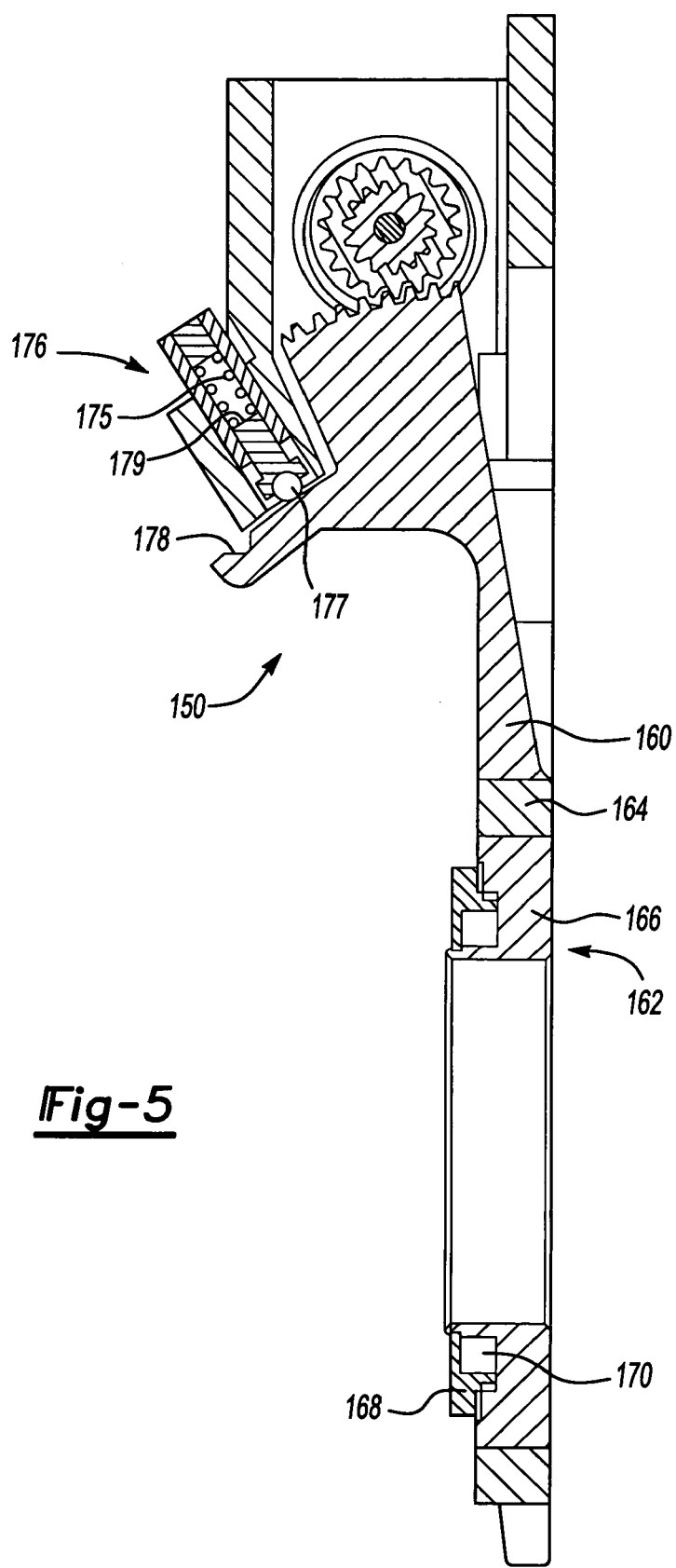
FIG. 5 is a cross-sectional view of the actuation mechanism for the coupling device shown in FIG. 4.
Figure 6:
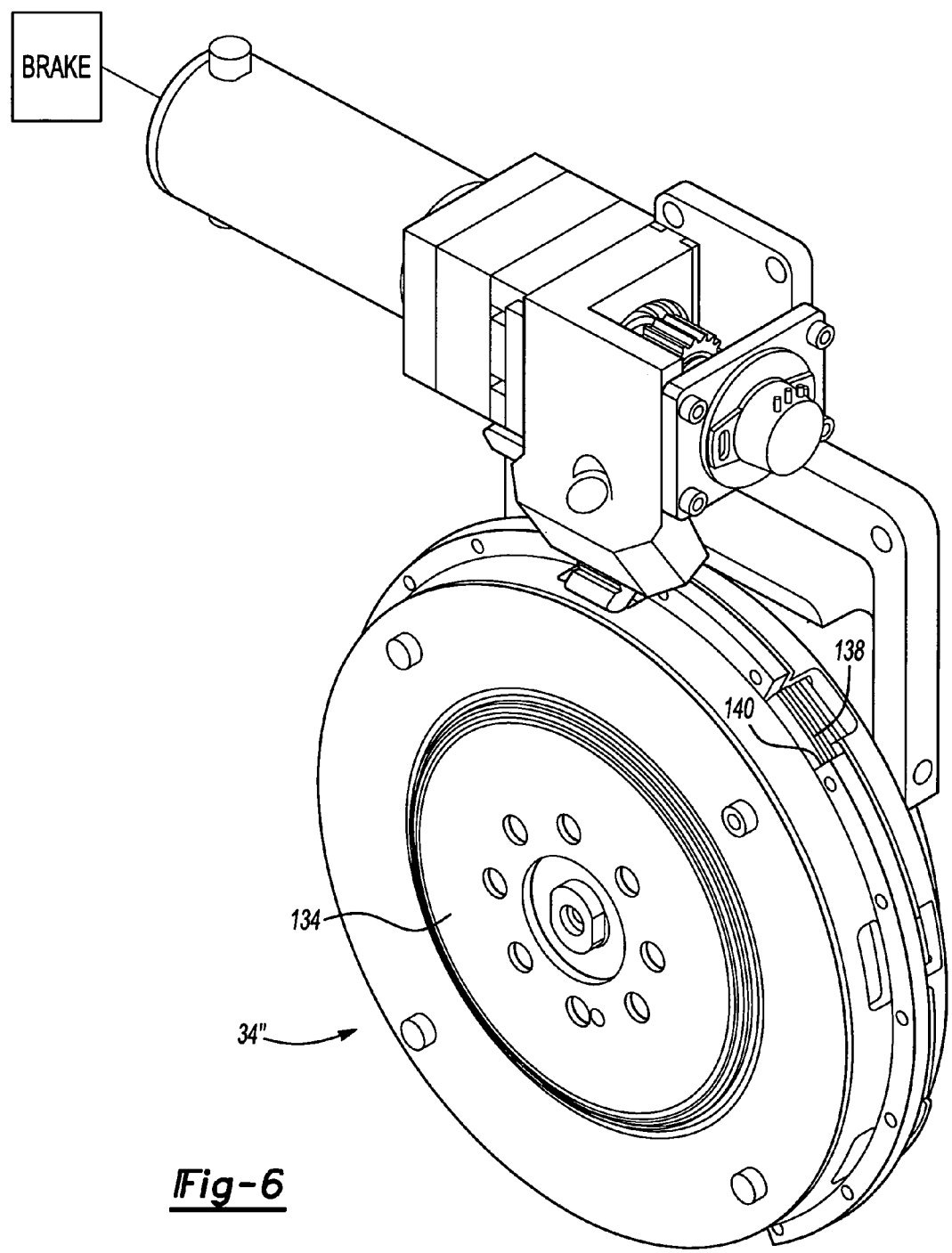
FIG. 6 is a front perspective view of the coupling device shown in FIG. 4.

FIG. 4 provides a detailed cross-sectional view of a coupling device, according to a third embodiment of the present invention. The coupling device 34" of FIG. 4 includes a hub 120 that is adapted to be mounted to the primary crankshaft 24. A clutch disc assembly 122 is mounted to the hub 120 by a spline connection 124. A pressure plate 126 is engageable with the clutch disc assembly 122. The clutch disc assembly 122 includes a dog clutch 128 on a face thereof that opposes a corresponding dog clutch portion 130 of a clutch plate carrier 132 which is adapted to be mounted to the secondary crankshaft 32 by a flex plate 134 which is provided with a plurality of holes for receiving fasteners for mounting the flex plate 134 to the second crankshaft 32. A pressure plate 136 is supported within the clutch plate carrier 132 for axial movement therein and includes radially extending fingers 138 which engage the clutch plate carrier 132 for driving rotation therewith. The radially extending fingers 138 of the pressure plate 136 are best shown in FIG. 6 wherein they are shown extending through an opening 140 in the clutch plate carrier 132. The pressure plate 136 is axially biased by springs 139 disposed in spring pockets 142 provided in the clutch plate carrier 132. The clutch plate assembly 122 is provided with damper springs as is known in the art provided between the friction disc portion 122a and hub portion 122b of the friction disc assembly 122.

Figure 7:
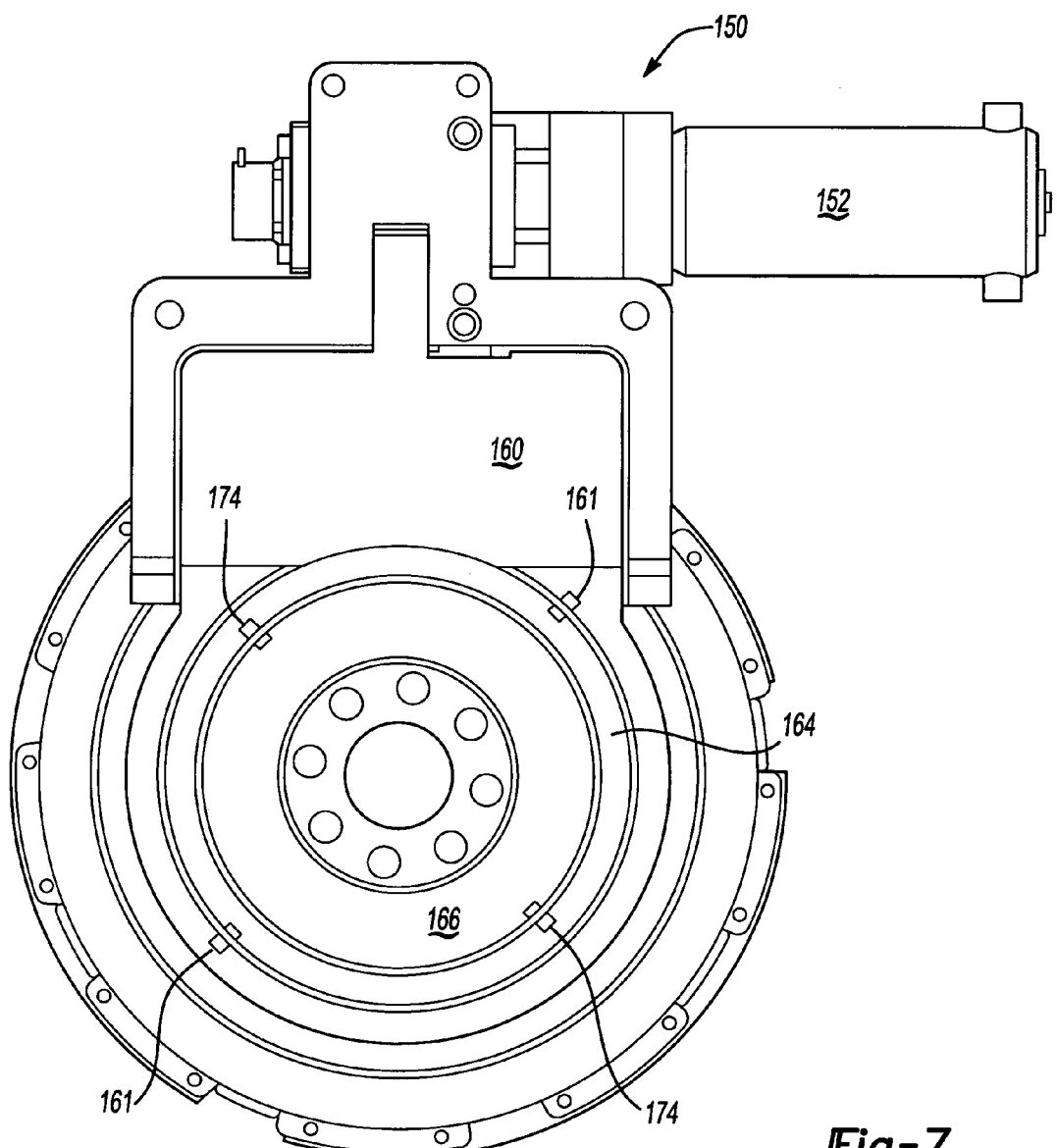
FIG. 7 is a rear view of the coupling device shown in FIG. 6.

Returning to FIG. 4, a clutch actuator 150 is provided for engaging coupling device 34". The actuator device 150 includes a motor 152 that is connected to a gear 154 by a driveshaft 156. The gear 154 meshingly engages a gear segment 158 provided on an actuator lever 160. The actuator lever 160 is connected to a gimbal assembly 162 (best shown in FIG. 5). The gimbal assembly 162 includes a large gimbal ring 164 and a small gimbal ring 166 which applies pressure to the pressure plate 126 via a bearing race 168 which is rotatably supported by a bearing 170. The gimbal assembly 162 allows pressure to be exerted by actuation of the actuating lever 160 by driving motor 152. In FIG. 7 the pinned connections 161 between the actuator lever 160 and the large gimbal ring 164, as well as the offset pivot pins 174 between the large gimbal ring 164 and the small gimbal ring 166, allow balanced pressure to be applied to the pressure plate 126. The actuator 150 is provided with a ball detent mechanism 176 including a spring biased ball 177 for engaging a detent 178 for maintaining the actuator lever 160 in an engaged position without requiring drive torque from the motor 152. The ball is biased by a spring 175 which presses against a plunger 179. Alternatively, the driving motor 152 can also be provided with a servo-brake for holding the output shaft 156 of the motor 152 in a predetermined position.

Figure 8:
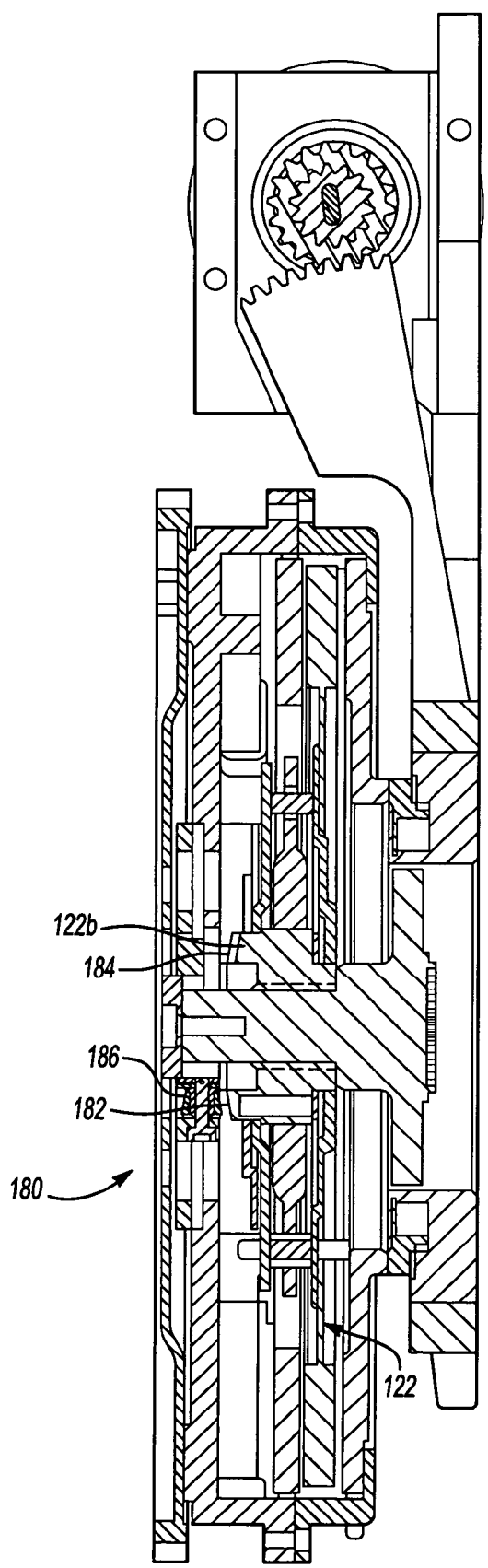
FIG. 8 is a cross-sectional view of a coupling device for a dual crankshaft engine according to a fourth embodiment of the present invention.
Figure 9:
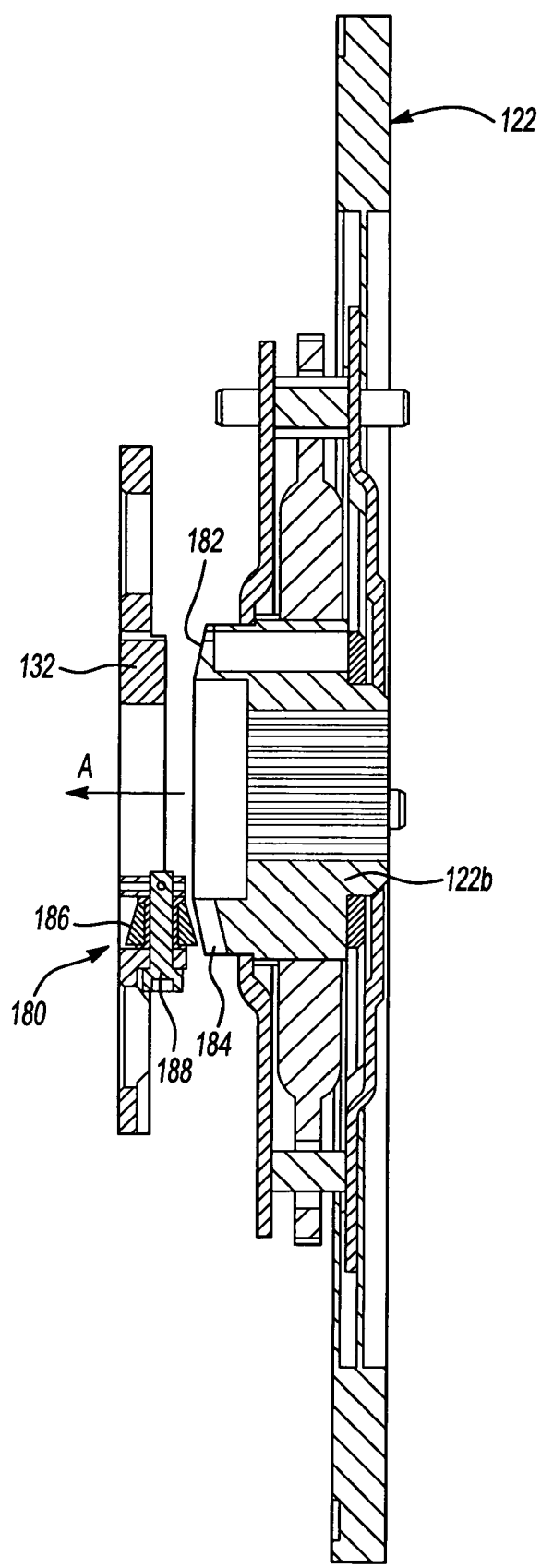
FIG. 9 is a detailed cross-sectional view of the phase clutch mechanism shown in FIG. 8.

With reference to FIGS. 8 and 9, a fourth embodiment of a coupling device, according to the principles of the present invention, will now be described.

With respect to the embodiment of FIGS. 8 and 9, the actuator mechanism 150 and starter clutch assembly are the same as described above with respect to the device of FIG. 4. However, the phase clutch portion includes a shuttle hub roller assembly 180. The shuttle hub roller assembly 180 includes a cone-shaped surface 182 disposed on a face of the hub portion 122b of the clutch disc assembly 122. A recessed roller groove 184 is provided in the cone-shaped surface 182. A cone shaped roller 186 is mounted to the clutch carrier 132 which is mounted to the second crankshaft 32. The roller 186 is rotatably supported on a support pin 188. When the clutch disc assembly 122 slides over (in the direction of arrow "A") to couple the secondary engine crankshaft 32 to the primary engine crankshaft 24, as described above, the clutch disc assembly 122 is spline indexed to the prime engine hub 120. Because the clutch disc 122 must be indexed to the second engine crankshaft 32 in order to synchronize the two engines 14a, 14b, the roller 186 rolls along the surface 182 of the hub 122b of the clutch disc assembly 122 until the relative rotation between the primary and secondary crankshafts 24, 32 is slow enough to allow the shuttle hub roller 186 to move until it drops into the roller groove 184, thus engaging the secondary crankshaft 32 in a preferred phase angle relationship relative to the primary crankshaft 24.

Figure 10:
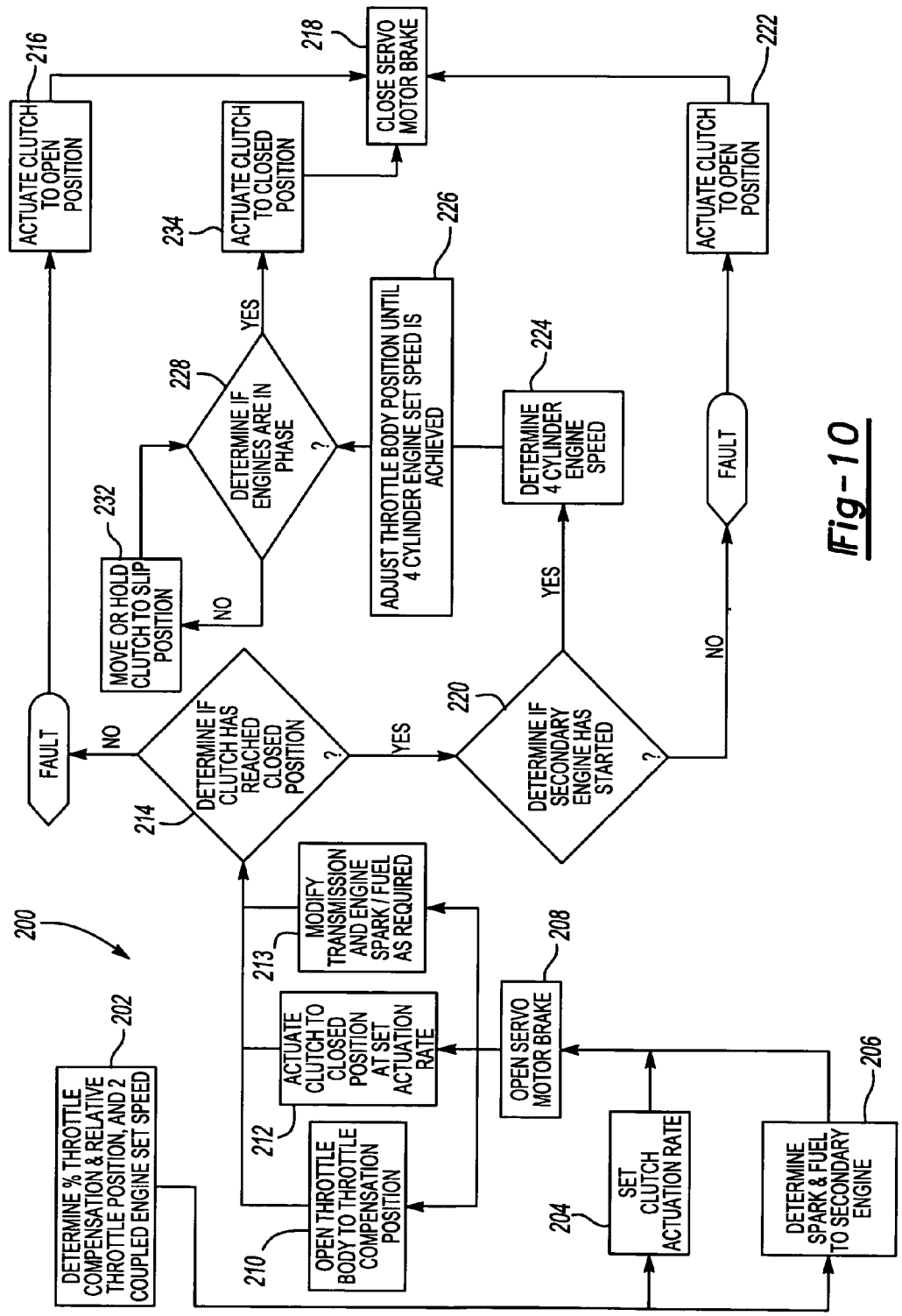
FIG. 10 is a flow chart illustrating a preferred control strategy for actuating the dual crankshaft engine described in FIGS. 1-9.

Turning to FIG. 10, a control strategy for controlling the powertrain 12, indicated generally by reference numeral 200, will now be described. The control strategy 200 is used to couple the second engine portion 14b to the first engine portion 14a when the first engine portion 14a is already driving the transmission 16 (and hence the wheels 20). The central processing unit (CPU) 40 (FIG. 1) determines when the second engine portion 14b should be engaged with the first engine portion 14a, such as when there is a torque request (i.e. acceleration request) from the accelerator 96 (FIG. 1) that the first engine portion 14a cannot deliver on its own, or whenever more torque is required than the primary engine portion 14a can provide. The control strategy 200 will be described with respect to a simplified clutch having two moving elements. However, it should be appreciated that any clutch design having any number of parts may be employed with the control strategy 200.

To begin, the CPU 40 at step 202 determines a current position of the primary throttle body 49, an amount of throttle compensation, and a set speed for the first engine portion 14a. The current position of the primary throttle 49 is indicative of the current amount of fuel flow into the primary engine 14a which in turn relates directly to the amount of torque output the first engine portion 14a is providing. The current primary throttle position is used as a baseline or reference point for the CPU 40. The amount of throttle compensation is the amount of throttle needed above the current position of the primary throttle body 49 (e.g. the amount the primary throttle body 49 must be opened to increase air flow into the first engine portion 14a). Alternatively, air/spark/fuel flow may be adjusted using any other method other than a throttle body. As will be described below, engaging the second engine portion 14b through the coupler 34 to the first engine portion 14a reduces the torque output from the first engine portion 14a. The throttle compensation is used to keep the first engine portion 14a at a desired torque output even after torque output is reduced by engaging the second engine portion 14b. The set speed is the speed of the primary and secondary engines that is desired after the second engine portion 14b is coupled to the first engine portion 14a.

A clutch actuation rate is then set at step 204 by the CPU 40. The clutch actuation rate is the rate at which the secondary clutch element 45 engages the first clutch element 43. Since the first clutch element 43 is spinning at whatever speed the primary engine portion 14a is currently operating at, quickly actuating the second clutch element 45 to engage the first clutch element 43 may cause a rapid deceleration that may be felt by an operator of the motor vehicle 10. Accordingly, the clutch actuation rate is mapped against various factors such as current vehicle speed in order to improve drivability. In this regard, the clutch actuation rate will vary under various vehicle conditions. Additionally, the clutch actuation rate may be a dynamic clutch actuation rate wherein the rate of clutch actuation may vary during the actuation event.

The spark and fuel to the second engine portion 14b is determined by the CPU 40 and the second engine portion 14b controller 44 is activated at step 206. This allows the second engine portion 14b to be sped up to match the speed output from the first engine portion 14a.

The CPU 40 opens the servo motor brake 47 at step 208. Alternatively, the detent system 177 (FIG. 5), springs 82 (FIG. 2), or any other locking system may be employed in lieu of the servo motor brake 47. The servo motor brake 47 while in an open position allows the second clutch element 45 to actuate.

The throttle body 49 is then throttled to a throttle compensation position at step 210. The throttle compensation position relates to the amount of throttle needed to maintain the output of the first engine portion 14a in preparation for the coupling of the second engine portion 14b (since a loss of torque to the transmission occurs during coupling). The throttle compensation position is calculated or determined by the CPU 40.

At step 212, the second clutch element 45 is actuated to a closed position at the set actuation rate such that the second clutch element 45 engages the first clutch element 43. After the second clutch element 45 engages the first clutch element 43, torque from the second engine portion 14b is transferred to the first crankshaft portion 24 through the first clutch element 43.

At step 213, control of the transmission 16 (FIG. 1) and the spark/air/fuel modules 44, 46 (FIG. 1) is modified to eliminate any torque or speed fluctuations from the engines. This prevents torque or speed output fluctuations from the transmission 16 during the coupling of the first and second clutch elements 43, 45.

The CPU 40 determines if the second clutch element 45 has fully closed at step 214. If the second clutch element 45 did not fully close with the first clutch element 43, a fault has occurred in the coupling device 34 and torque from the second engine portion 14b cannot be fully transferred to the first crankshaft portion 24. The CPU 40 then actuates the second clutch element 45 to fully open at step 216. The servo motor brake 47 is then closed at step 218 thereby locking the coupling device 34 in an open position. At this point the method 200 ends and no additional torque has been provided by the second engine portion 14b.

If, however, the CPU 40 determines at step 214 that the second clutch element 45 has fully closed with the first clutch element 43, then the CPU next determines whether the second engine portion 14b has been started (e.g. whether the second engine portion 14b is receiving spark, air, and fuel from the secondary modules 46 and whether the engine controller (not shown) has started the second engine portion 14b) at step 220.

If the second engine portion 14b has not been started, this indicates a fault has occurred and the CPU 40 actuates the second clutch element 45 to fully open from the first clutch element 43 at step 222. Since the second engine portion 14b cannot supply any torque, it is desirable to disengage the second engine portion 14b from the first crankshaft portion 24. The method 200 then ends by closing the servo motor brake at step 218 such that the second clutch element 45 is fixed in an open position.

If the secondary engine portion 14b has been started, then the CPU 40 next determines a current speed of the primary and secondary engines 14a, 14b at step 224. At this point, the secondary engine 14b is fully engaged with the first engine portion 14a through the coupling device 34, and the current speed of both engines 14a, 14b will most likely be different than the engine speeds prior to initiation of the method 200.

The position of the throttle body 49 is then adjusted by the CPU 40 at step 226 until the engine set speed determined at step 202 has been achieved by the engines 14a, 14b.

At step 228, the CPU 40 determines if the second engine portion 14b is in phase with the first engine portion 14a. When in phase, the shaking forces caused by the pistons 36 of the second engine portion 14b offset the shaking forces caused by the pistons 26 of the first engine portion 14a, thereby reducing any unwanted engine vibrations. Determining whether the engines 14a, 14b are in phase with one another is preferably accomplished with electronic sensors and/or software.

If the engines 14a, 14b are not in phase, the CPU 40 determines a slip rate at step 232. The slip rate is the desired rate at which the second clutch element 45 will be allowed to slip (e.g. the rate at which the second clutch element 45 will rotatingly lead in respect to the first clutch element 43). The second clutch element 45 is then actuated away from the first clutch element 43 at the desired slip rate at step 232. The CPU 40 again determines whether the engines 14a, 14b are in phase at step 228.

Once the CPU 40 has determined that the engines 14a, 14b are now in phase with one another, the CPU 40 actuates the second clutch element 45 to the closed position at step 234. At this point the second clutch element 45 is again fully engaged with the first clutch element 43. At step 218 the servo brake motor 47 is closed and the second clutch element 45 is locked in position. The method 200 ends with the second engine portion 14b fully engaged with and in phase with the first engine portion 14a through the coupling device 34.

The description of the invention is merely exemplary in nature and, thus, variations that do not depart from the gist of the invention are intended to be within the scope of the invention. For example, although the preferred embodiment is illustrated with a piston engine, it should be understood that a rotary engine or any other engine could also be utilized. Likewise, although the system utilizes an electro-mechanical actuator, other known actuator mechanisms such as pneumatic, hydraulic, or magnetic actuators may be utilized. Finally, although the system is disclosed utilizing a dry clutch system, a wet clutch or electromagnetic clutch system or any other clutch system may also be utilized. Such variations are not to be regarded as a departure from the spirit and scope of the invention.

What is claimed is:

1. A method for coupling a first output shaft to a second output shaft in a vehicle having a dual output shaft engine, the method comprising:
   determining when the first output shaft should be coupled to the second output shaft;
   actuating a clutch to a closed position such that the first output shaft is coupled to the second output shaft;
   determining whether the first output shaft and the second output shaft are in phase; and
   actuating the clutch to slip if the first output shaft is not in phase with the second output shaft and actuating the clutch to the closed position when the first output shaft and the second output shaft are in phase;
   wherein when, if actuating the clutch to the closed position, the clutch does not fully close, the clutch is actuated to an open position such that the first output shaft is not coupled to the second output shaft.

2. The method of claim 1, further comprising:
   determining a set speed for the first and second output shafts that corresponds to a desired power output from the first and second output shafts; and
   adjusting the current speed of the output shafts so as to maintain the set speed of that shaft after coupling of the first and second output shafts.

3. The method of claim 1, wherein actuating the clutch to the closed position is accomplished using a rate of actuation determined from operating conditions of the vehicle.

4. The method of claim 3, wherein the rate of actuation varies during actuation of the clutch.

5. The method of claim 1, wherein if the second output shaft is not producing power output, the clutch is actuated to an open position such that the first output shaft is not coupled to the second output shaft.

6. The method of claim 1, further comprising controlling a transmission such that an output of the transmission is not affected by speed or torque fluctuations on the first output shaft as a result of coupling the first output shaft to the second output shaft.

* * * * *